Feb. 11, 1958 L. A. MEACHAM 2,823,267
DELAY CIRCUIT FOR AMPLIFYING DEVICE
Filed March 29, 1956
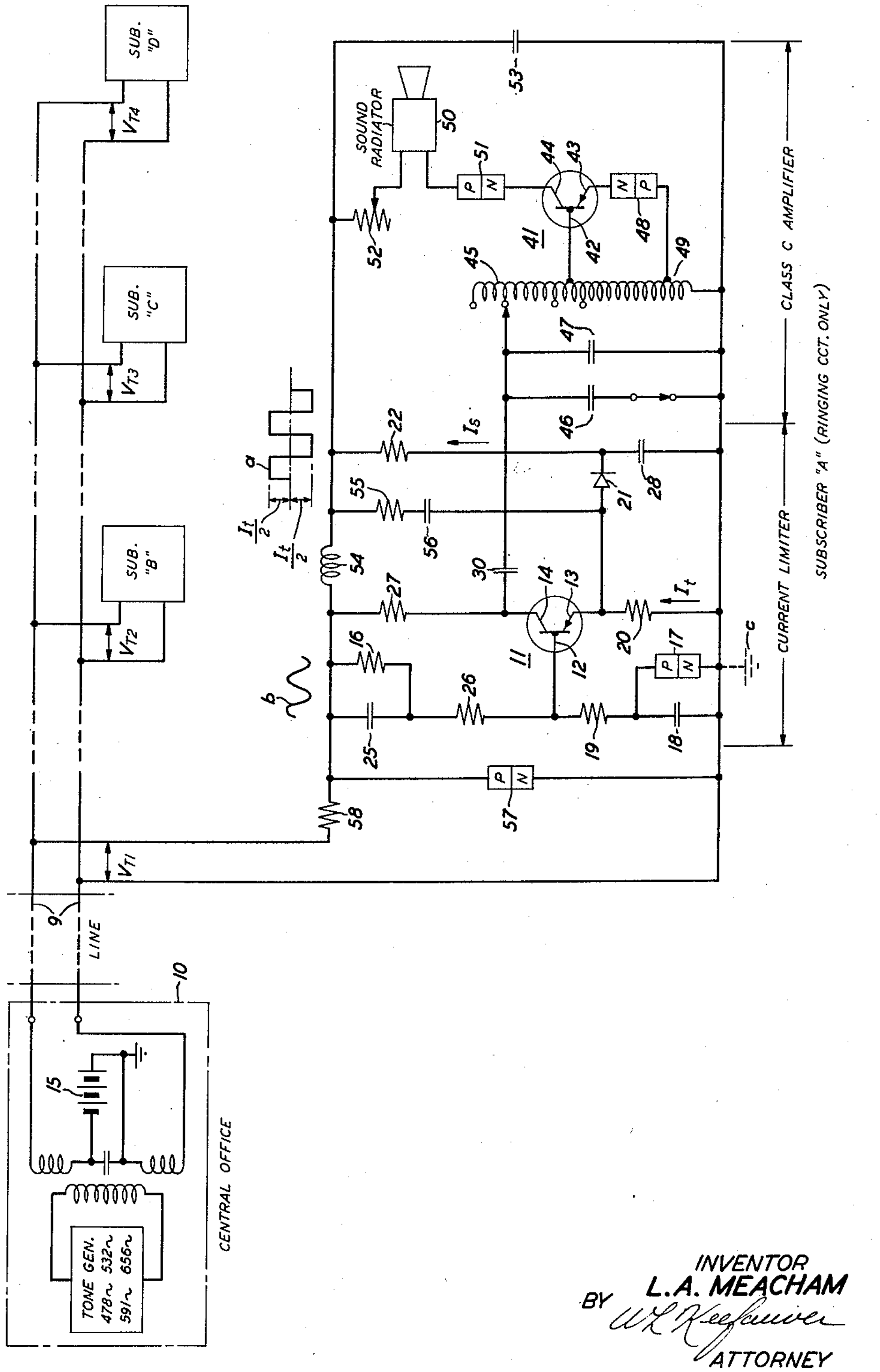
INVENTOR
L. A. MEACHAM
BY W. L. Keefauver
ATTORNEY 2,823,267
Patented Feb. 11, 1958

2,823,267

DELAY CIRCUIT FOR AMPLIFYING DEVICE

Larned A. Meacham, New Providence, N. J., assignor to Bell Telephone Laboratories, Incorporated, New York, N. Y., a corporation of New York Application March 29, 1956, Serial No. 574,715

7 Claims. (Cl. 179—84)

This invention relates to delay circuits and, in particular, to circuits for disabling a circuit including an amplifying device for a predetermined period following a conditional change in means which may or may not be directly associated with the amplifying device.

An object of the present invention is to hold an amplifying device cut off for a predetermined period following a voltage change which may or may not be directly related to the amplifier.

Another object of the invention is to disable a circuit including an amplifying device for a predetermined period following a change in the voltage of a source from a first value to a second value.

A more specific object of the present invention is to disable the signalling circuits in the telephone sets of a party-line telephone system for a predetermined period following a change in party-line condition from any one set being off-hook to all sets being on-hook.

In a particular party-line telephone system, to which the invention is applicable although not limited, signalling is accomplished by signals having frequencies lying in the same range as the speech currents. Selectivity is achieved by assigning different frequencies to the various subscribers. As described in a copending application of J. R. Power, Serial No. 574,718, filed of even date herewith, all signalling devices are disabled when any party is off-hook by a breakdown diode connected in series with the signalling device. This prevents false operation of any of the signalling devices by speech currents. Lockout is achieved by making use of the fact that the terminal voltage of each set varies between a first value when all parties are on-hook and a second value when any party is off-hook. These voltage changes are employed to bias the breakdown diodes in their breakdown condition when all parties are on-hook and in their high reverse impedance condition when any party is off-hook.

It was found, however, that when a talking party goes on-hook, it takes the central office a fraction of a second to recognize the on-hook condition and remove any busy signals, or the like, from the line. It was, therefore, found necessary to provide means for maintaining lockout for this additional period.

In an illustrative embodiment of the invention, described in more detail below, lockout for this additional period is achieved by a simple delay circuit which delays the re-enabling of the signalling circuit in each party-line substation circuit. An amplifying device in each signalling circuit is provided with a negative feedback resistor for current stabilization purposes. In accordance with principles of the invention, further use is made of this resistor by connecting a capacitor to respond to changes in terminal voltage and to be charged by a circuit including this resistor. The capacitor charging current is sufficient in magnitude and duration to develop a bias across the resistor which restricts conduction by the amplifying device to a level insufficient for the signalling circuit to be re-enabled for the desired period.

The invention, including its various features and objects, will be more fully appreciated from a consideration of the single figure of the drawing in which there is illustrated a party-line telephone system including ringing circuits embodying principles of the invention.

The attached figure illustrates four telephone subscribers, designated subscribers A, B, C, and D, bridged on a common or party line 9 which extends to a central office 10. The ringing or signalling circuit only of subscriber A is illustrated in detail; the ringing circuits of the other subscribers are assumed to be similar and the speech circuits have not been illustrated since they form no part of the present invention.

Signalling is accomplished by four frequencies which lie in the voice frequency range. These frequencies, 478, 532, 591, and 656 cycles, are chosen so that the ratio of adjacent frequencies is 9 to 10, and may be interrupted at a low frequency in order to give the resulting sound a distinctive character. This ratio insures that neither second nor third harmonics of the lower frequencies coincide with the fundamentals of any of the higher frequencies, particularly where the same series of frequencies is extended upward to accommodate more than four parties or for other purposes. It is assumed that these four frequencies are assigned, respectively, to subscribers A, B, C, and D. If eight parties were assigned to a common line on a full-selective basis, the additional signalling frequencies would be 729, 810, 900, and 1000 cycles.

Each ringing circuit, or tone ringer, as it may be called, is therefore equipped with a frequency selective circuit responsive to the particular frequency assigned to its associated subscriber, and with means for radiating the selected tone when received.

Frequency selectivity is achieved, in part, by the output stage which comprises a Class C amplifier having a tuned input circuit. Since high Q circuits are expensive to build, it is impracticable to obtain sufficient selectivity from the tuning elements alone. The use of Class C amplification contributes a major part of the selectivity, in that it gives no output unless the response of the tuned circuit exceeds a certain minimum amplitude. The band of frequencies for which the amplifier gives output is thus a function of the amplitude of the current driving the tuned circuit. Also, as may be seen from the illustrative signalling frequencies given above, it is important to provide discrimination against second harmonics, particularly of lower signalling frequencies, so that ringers assigned the higher frequencies will not respond to second harmonics of the lower frequencies. Accordingly, still further frequency discrimination is achieved by the current limiter stage preceding the amplifier which derives from the signalling waves a rectangular waveform *a* having a closely regulated peak-to-peak amplitude, so as to provide a constant driving current, and one which is symmetrical both with respect to an arbitrary zero axis and with respect to the duration of the positive and negative portions. The constancy of amplitude insures uniformity of bandwidth, and the symmetries insure that the second harmonic components of the input waves will be zero. The third harmonic components are unimportant here, as they fall above the range covered by ringing frequencies for as many as eight parties, the largest number contemplated in this embodiment.

Since signalling is accomplished by currents whose frequencies lie within the band of the speech currents, it is necessary to disable the ringing circuit of each subscriber when any one of the subscribers on the line is off-hook. This protection is herein denoted as "talk-off" protection. Talk-off protection, in general, is provided by a p–n junction silicon breakdown diode 51 which is connected in series with the sound radiator 50. This diode may be of a type described in an article by F. H. Chase, B. H. Hamilton, and D. H. Smith entitled "Transistors and Junction Diodes in Telephone Power Plants," Bell System Technical Journal, July 1954, volume 33, page 827. When all subscribers are on-hook, the terminal voltages $V_T$ of the various sets will lie in the range of 40 to 50 volts in the illustrative embodiment, depending on loop length. When any one set is off-hook, the additional load placed on the line thereby will reduce the terminal voltage of each set to a value in the range of from 13 to 23 volts. A diode 51 is, therefore, chosen which has a breakdown voltage slightly greater than the expected maximum off-hook value, for example 25 volts. In its breakdown region, diode 51 represents a negligible alternating-current impedance so that when all sets are on-hook, it absorbs a negligible portion of the power delivered by amplifier 41 to the sound radiator 50. When any subscriber goes off-hook, however, the terminal voltage is insufficient to maintain breakdown, so that diode 51 assumes its high reverse impedance of several megohms, or so. This high impedance, in series with the sound radiator 50, makes any appreciable output from the latter impossible.

When an off-hook party goes on-hook, however, the central office delays action for a fraction of a second before it recognizes the on-hook condition and removes any of the various signalling tones, such as busy signals, no-such-number, etc. which may be on the line. This central office delay is provided to avoid false disconnects in response to momentary switch-hook operations. With only diode 51 to provide talk-off protection, all signalling circuits would be immediately re-enabled and undesired response from these various signalling tones might result. In accordance with principles of the invention, however, an amplifying device 11, whose output is coupled to amplifier 41, is effectively disabled for this additional period. This disablement is accomplished by connecting capacitor 56 to respond to changes in terminal voltage and to be charged by a circuit which includes a large valued current stabilizing resistor 20. The time constant associated with the charging circuit for capacitor 56 and the charging current drawn through resistor 20 are such as to lower the output of device 11 sufficiently to prevent response by the amplifier 41 for this additional interval.

The specific circuit illustrated will now be described in detail. The current limiter stage of the tone ringer comprises a p–n–p junction transistor 11 having base 12, emitter 13, and collector 14. (This current limiter forms the principal subject matter of a copending application of mine, Serial No. 574,714, filed of even date herewith.) Biasing and operating voltages for this transistor are provided by the source of direct current 15 located at the central office. The base of the transistor is given a fixed bias by a voltage divider connected across the line and comprising, primarily, resistor 16 and a p–n junction silicon breakdown diode 17 by-passed for alternating currents by capacitor 18. The values of resistors 19 and 26 are low relative to the direct-current resistance of resistor 16 and diode 17, and may be neglected for the moment. The collector 14 is returned to the negative line terminal by load resistor 27.

The silicon junction diode 17 may be of the same type as diode 51. As with diode 51, a significant characteristic of this type of diode is that it exhibits a substantially constant voltage across its terminals for applied reverse biases which exceed a critical or breakdown voltage. In the illustrative embodiment, a diode 17 is selected which has a breakdown voltage of 9.4 volts so that the base 12 of the transistor with respect to an arbitrary reference point *c*, actually the positive line terminal, has a fixed bias of about 9.4 volts.

A self-biasing resistor 20 is connected in series with the emitter electrode and serves to stabilize the emitter current by negative feedback. The transistor, in fact, regulates the voltage across this resistor to be approximately the same as the voltage across the diode 17. The bias on the base is sufficient to bias the transistor normally conducting so that a current $I_t$ normally flows through resistor 20. This current, in fact, is held substantially constant at this value.

As described in my above-mentioned copending application, fifty percent of this regulated current $I_t$ is by-passed around the transistor by a circuit including a diode 21 and a resistor 22 which is connected to the negative line terminal. In the absence of applied signals, diode 21 is conducting and hence a low resistance. The remaining fifty percent of $I_t$ flows through the collector and resistor 27.

Signal input, waveform *b*, is coupled to the base by a capacitor 25 and resistors 26 and 19. (The diode 17 and by-pass capacitor 18 represent a substantially zero alternating-current impedance.) As the input signal swings the base above its mean bias potential, the chosen bias is such that the transistor is driven to cut-off by the positive peaks of the input signals. As the input signal swings the base below its mean bias potential, the emitter current of transistor 11 increases until it becomes equal to $I_t$, which remains substantially constant. As a result, the current through diode 21 falls to zero, and this diode cuts off. Furthermore, when the diode 21 is conducting, it has a low resistance, and under this condition, the emitter 13 faces a low impedance produced by capacitor 28 in series with the diode 21, effectively by-passing resistor 20 for signal current. As a result, the rate of change of emitter current with base voltage is rapid over the region between cut-off of the transistor 11 and cut-off of the diode 21. When diode 21 becomes nonconducting, however, the impedance faced by the emitter rises to the relatively large value determined by resistor 20 (93,100 ohms in a specific embodiment). This large impedance provides a sufficient amount of negative feedback so that any appreciable further increase in emitter current is prevented. Accordingly, the variation in emitter current is limited at $I_t$, peak-to-peak. Since most of this emitter current passes through the collector 14, the latter delivers, at high source impedance, a square wave of current limited at $\pm I_t/2$ which flows through capacitor 30 to the input of the Class C amplifier.

It may be noted that $I_{c0}$ flows through a path including resistors 27 and 19. This affects the direct-current collector potential and to a small amount the bias on the base, but its variations with temperature, aging, or from one transistor to another, have no appreciable effect on the peak-limited output since the same amount of $I_{c0}$ is added, as a bias, to both the positive and negative swings of the output current. The limiting value is determined approximately by current flowing through resistor 20, a path which does not include $I_{c0}$.

In this circuit, the base never accepts more than a few microamperes of signal input current. Its alternating-current input impedance is almost infinite except for a small range of signal voltages near zero (resistor 26 insures that the impedance facing the loop will be sufficiently high at these low amplitudes) and symmetrical for positive and negative swings. Accordingly, the signal voltage at the base is almost a pure sine wave. This is important because of the following considerations. In order that the clipped current delivered to the tuned input circuit of the amplifier may contain a uniform amount of the fundamental component, its duty cycle should remain fairly constant, as well as its peak amplitude. Moreover, since the second harmonic of the lowest signal frequency (478 cycles) falls about midway between the two highest ones for eight parties (900 and 1000 cycles), it is desirable that the second harmonic of the signal frequency be kept small by holding the duty cycle close to fifty percent. That is, the time of the square wave should not only be stable, but also symmetrical in order to maintain sensitivity margins and to avoid the possibility of false signalling by the second harmonic of the 478-cycle signalling frequency.

If $I_t$ is the total direct current flowing in resistor 20 and $I_s$ is the by-pass direct current flowing in resistor 22, it can be shown that the ratio of the durations $t_1$ and $t_2$ of the two half-cycles of the square wave is $$\frac{t_1}{t_2}=\frac{I_s}{I_t-I_s}$$

The "duty cycle" may be expressed as $$\frac{t_1}{t_1+t_2}=\frac{I_s}{I_t}$$

Resistors 20 and 22 are, therefore, chosen in relation to the expected average on-hook loop potential and the bias voltage, from diode 17, to make $I_s$ half as large as $I_t$. Some departure from the ideal fifty-fifty division of current can be tolerated, however.

The collector resistor 27 is chosen with several conflicting considerations in mind. From an alternating current standpoint, a large value is desirable so that all of the alternating current will flow into the tuned circuit even at resonance. From a direct-current standpoint, a small value is desirable so that the total direct-current voltage drop will not exceed the available collector voltage. A value of 240,000 ohms was found acceptable in one embodiment from both standpoints. It might be noted that resistor 27 also controls the value of a small alternating current which flows from the line through resistor 27, capacitor 30 and the resonant input circuit of the Class C amplifier. This current is proportional to the alternating-current signal voltage on the line and 180° out of phase with the main driving current in the resonant circuit. This out-of-phase current provides compensation for slight imperfection in the regulation of the current limiter stage.

Turning now to the Class C amplifier; this amplifier comprises a p–n–p transistor 41, having base 42, emitter 43, and collector 44 electrodes. A resonant input circuit comprises the coil 45, provided with selectable taps, and a pair of capacitors 46 and 47. A substantially constant voltage drop, equivalent to a small negative bias, is applied in series with the emitter by a p–n junction silicon diode 48 which may be similar to diode 17, but which is connected with opposite polarity, having a breakdown voltage, in the "forward" direction, on the order of .6 volt. Base current flows at each negative voltage peak, driving the transistor to saturation; the transistor 41, therefore, behaves as a switch which opens and closes the collector-emitter path at an audio frequency rate and delivers energy which is converted to audible sound by the sound radiator 50. The sound level may be adjusted by potentiometer 52. A pulse of collector current flows through this radiator for a portion of each cycle, generating the tone ringer audible output. The capacitor 46 is made selectable and the coil 45 is provided with several taps so that the desired tuning frequencies are available by selection of various tap-capacitor combinations.

The alternating-current output circuit for transistor 41 is completed through capacitor 53. This capacitor, together with coil 54, forms a low pass filter across the "power supply." Coil 54 further acts as a choke coil and prevents the current surges delivered to the sound radiator 50 from getting onto the line 9.

The frequency discrimination afforded by the resonant input circuit is further increased by the amplitude gating action of the diode 48. Only when the voltage peaks across the portion of the tuned circuit between a tap 49 on the inductor 45 and the base 42 are greater than about 0.6 volt, the "breakdown" voltage of the diode, is there sufficient base current to drive the transistor.

In order to maintain good selectivity and high sound output, the $\alpha$ of the transistor 41 should be close to unity. This follows from a need to have the transistor reach saturation without putting too great a load on the tuned circuit, and from the fact that the common-emitter configuration current gain is equal to $\alpha/1-\alpha$. The value of $\alpha$ may be effectively increased by adding positive feedback. This feedback is obtained by returning the emitter 43 circuit to the tap 49 on the inductor 45. The amount of feedback is carefully chosen so that oscillation does not occur as a result of a combination of high Q and high $\alpha$.

As described above, breakdown diode 51, in series with the sound radiator 50, provides talk-off protection when any party is off-hook by preventing any appreciable out-put from the sound radiator. This feature, in fact, forms the principal subject matter of the copending Power application mentioned above. Also, as described in the Power application, a diode 51 is chosen which has a breakdown voltage not only intermediate the on-hook and off-hook terminal voltage values, but also as close as possible to the value required for proper operation of the collector 44 of transistor 41. Diode 51, therefore, drops the line voltage to the value normally required for proper operation of the transistor, otherwise an excessive line voltage might exceed the maximum collector voltage of the transistor.

As noted above, however, the central office waits a fraction of a second before recognizing the on-hook condition and removing any signalling currents which may be on the line 9. Were the ringing circuits immediately re-enabled, the tone ringers might be falsely energized by such signals.

In accordance with principles of the invention, the tone ringer is disabled by the circuit including resistor 55 and capacitor 56. When the line voltage goes from its off-hook value to its higher on-hook value, the voltage across capacitor 56, as well as the voltage across capacitor 18, gradually increases to its higher value. Initially, the fairly large value of capacitor 18 (2 microfarads) holds the base voltage more positive than normal. Further, the charging current for capacitor 56 flowing through the bias stabilizing resistor 20 pulls the emitter voltage negative, cutting off the transistor. The transistor remains cut off until the base and emitter voltages readjust themselves to a condition such that the base is negative with respect to the emitter. Even for a time after the emitter becomes conducting the branch including capacitor 56 and resistor 55 shunts away enough of the available current $I_t$ to keep the collector current smaller than that required to give a duty cycle sufficiently near fifty percent for enabling the Class C amplifier. In a particular embodiment, a capacitor 56 of 1 microfarad, together with resistors 20 and 55 of 93,100 and 200,000 ohms, respectively, were found to delay the re-enabling of the ringing circuit for .2 to .8 of a second, adequate to allow for the delay of the central office in recognizing the on-hook condition and removing signalling currents from the line.

Protection against transients or lightning is afforded by a breakdown diode 57. This diode is similar to diodes 17 and 51 but has a breakdown voltage higher than the normal line voltage. It will, therefore, break down only for excessive voltages and protect the remainder of the circuit, particularly the transistors, from damage. Resistor 58 limits to a safe value the current drawn when diode 57 breaks down.

Although the invention has been described in its relation to a specific embodiment, it should not be deemed limited to the specific embodiment illustrated, since numerous other embodiments and modifications will readily occur to one skilled in the art without departing from the spirit or scope of the invention.

What is claimed is:

1. In combination: an amplifier, a biasing circuit for said amplifier including an impedance element, across which an amplifier biasing voltage is developed, means for applying signals to said amplifying device, a source of voltage which may vary between a first and a second value, and means for effectively disabling said amplifier for a predetermined period following a change in said voltage from said first value to said second value comprising a capacitor and means connecting said capacitor in a charging circuit including said source and said impedance element, the charging current for said capacitor being sufficient to bias said amplifier cut-off.

2. The combination in accordance with claim 1 and a resistor connected in series with said capacitor, said resistor, capacitor and impedance element have a time constant proportioned to hold said amplifier cut off for said predetermined period.

3. In combination: an amplifier having first, second, and third electrodes, an input circuit including said first and second electrodes, an output circuit including said second and third electrodes, a negative feedback impedance element connected in series with said second electrode and common to said input and output circuits, a source of voltage which may vary between a first and a second value, and means for holding said amplifier cut off for a predetermined period following a change in said voltage from said first value to said second value comprising a capacitor connected between said source and the junction of said second electrode and said impedance element.

4. In combination: an amplifying device having first, second and third electrodes, an input circuit including said first and second electrodes, an output circuit including said second and third electrodes and a negative feedback impedance connected in series with said second electrode and common to said input and output circuits, a source of operating voltage connected to said third electrode, the voltage of said source varying between a first and a second value, and means for disabling said amplifier for a predetermined period following a change in the voltage of said source from said first to said second value comprising a capacitor, and means connecting said capacitor in a charging circuit independent of said amplifying device and including said impedance element.

5. In combination: a plurality of substation circuits connected by a common transmission line to a common source of direct current, each of said substation circuits having an off-hook condition and an on-hook condition, said off-hook condition for any one of said substation circuits providing a substantially lower voltage on said line than said on-hook condition for all of said substation circuits, each of said substation circuits having a signalling circuit including an amplifying device and a signal indicating device energized by the output of said amplifying device, said amplifying device having first, second, and third electrodes, means for applying signals to an input circuit including said first and second electrodes, an output circuit comprising said third and second electrodes, a resistor connected in series with said second electrode and common to said input and output circuits, means for disabling the signalling circuits of each substation circuit in response to said off-hook condition of any substation circuit, and means for holding each of said signalling circuits disabled for a predetermined period following a change from any substation circuit being off-hook to all substation circuits being on-hook comprising a capacitor, a charging circuit for said capacitor including said source and said resistor and independent of said transistor, said charging circuit having a time constant to draw a charging current through said resistor of sufficient magnitude and duration to disable said signalling circuit for said predetermined time.

6. The combination in accordance with claim 5 wherein said amplifying device comprises a transistor having base, collector, and emitter electrodes, wherein said input circuit includes said base and emitter electrodes, said output circuit includes said collector and emitter electrodes, wherein said resistor is connected in series with said emitter and between said emitter and one side of said line, and wherein said capacitor is connected between the other side of said line and the junction of said emitter and said resistor.

7. In combination: a source of direct current having positive and negative terminals, a transistor having base, collector, and emitter electrodes, means connecting one terminal of said source to said collector electrode, a current stabilizing resistor connected between said emitter and the other terminal of said source of direct current, a source of signals, means for applying said signals to said base electrode, and a capacitor connected between the junction of said emitter and resistor and said one terminal of said source of direct current, the charging time constant for said capacitor being sufficient to effectively disable said transistor with respect to signal transmission for a predetermined time following a predetermined change in the value of the voltage applied across said emitter and collector electrodes by said source of direct current.

No references cited.